(12) United States Patent
Seier et al.

(10) Patent No.: US 7,187,728 B2
(45) Date of Patent: Mar. 6, 2007

(54) CODING METHOD AND USE OF A RECEIVER WITH A CONVOLUTIONAL DECODER

(75) Inventors: Udo Seier, Marbach (DE); Joerg-Martin Mueller, Stuttgart (DE); Andreas Engel, Mainhardt (DE)

(73) Assignee: Marconi Communications GmbH, Backnang (DE)

( * ) Notice: Subject to any disclaimer, the term of this patent is extended or adjusted under 35 U.S.C. 154(b) by 726 days.

(21) Appl. No.: 10/204,299

(22) PCT Filed: Feb. 23, 2001

(86) PCT No.: PCT/IB01/00397

§ 371 (c)(1),
(2), (4) Date: Nov. 18, 2002

(87) PCT Pub. No.: WO01/63871

PCT Pub. Date: Aug. 30, 2001

(65) Prior Publication Data

US 2005/0031049 A1    Feb. 10, 2005

(30) Foreign Application Priority Data

Feb. 24, 2000 (DE) .............................. 100 08 543

(51) Int. Cl.
*H04L 5/12* (2006.01)
*H04L 23/02* (2006.01)
*H04L 27/06* (2006.01)
*H04L 27/20* (2006.01)
*H03D 1/00* (2006.01)
*H03D 3/00* (2006.01)
*H03C 3/00* (2006.01)

(52) U.S. Cl. .................. 375/341; 375/264; 332/103; 329/304

(58) Field of Classification Search ................ 375/264, 375/268–269, 271–273, 279, 300, 303, 308, 375/320, 323, 329, 341; 329/300, 304; 332/100, 332/103
See application file for complete search history.

(56) References Cited

U.S. PATENT DOCUMENTS 5,931,965 A * 8/1999 Alamouti ..................... 714/792
6,005,897 A    12/1999 McCallister et al.

OTHER PUBLICATIONS

Hayashi, S. et al: Performance of Trellis-Coded 16-State Differentially Encoded APSK on Rayleigh Fading Channel, IEEE, Nov. 6, 1995, pp. 32-36.
Lau, H. K. et al: A Pilot Symbol-Aided Technique Used For Digital Signals In Multipath Environments, ICC, May 1, 1994, pp. 1126-1130.

* cited by examiner

*Primary Examiner*—Khai Tran
*Assistant Examiner*—Aslan Ettehadieh
(74) *Attorney, Agent, or Firm*—Kirschstein, et al.

(57) ABSTRACT

A coding method for modulating carrier signals with 16 different digital states (4 bit signals) possesses a high synchronicity robustness and an at least partially improved coding gain. The coding parameters are obtained by the following steps: a) using a 2 ASK/8 PSK coding; b) choosing a convolutional code and determining all possible code word sequences with the free distance of the convolutional code; c) producing possible mappings by allocating a partial quantity of the 2 ASK/8 PSK channel bits to subsets; d) choosing the mapping at which, after determination of the optimum radii of the two amplitudes for every possible mapping, the resulting minimum Euclidean distance takes a maximum value between two possible subset sequences code word sequence.

3 Claims, 2 Drawing Sheets

CODING METHOD AND USE OF A RECEIVER WITH A CONVOLUTIONAL DECODER

Figure 1:
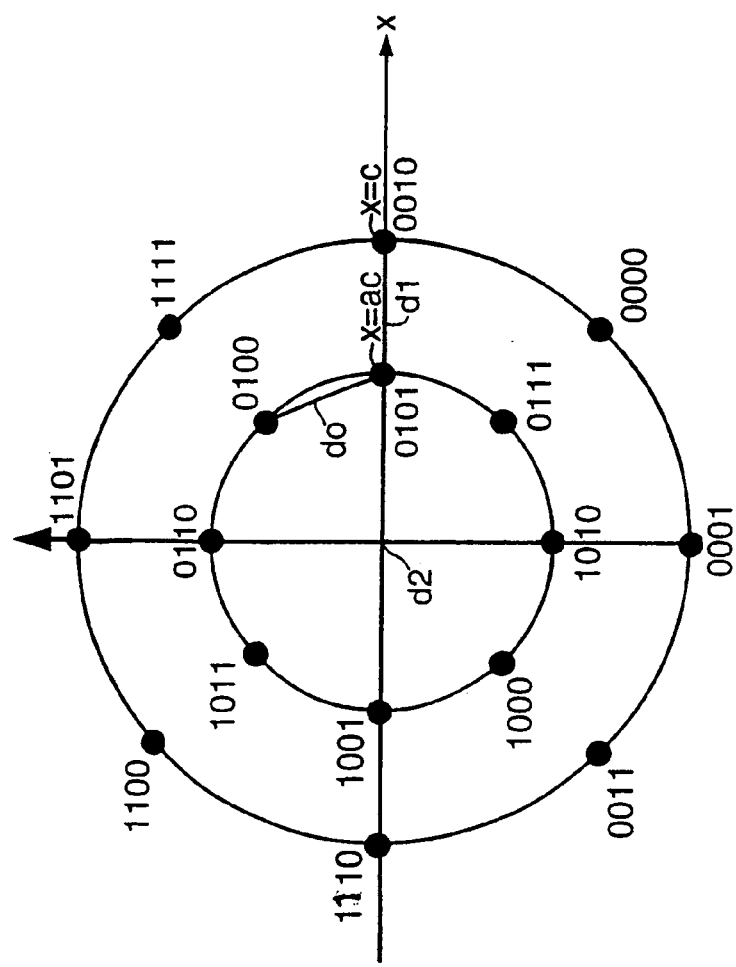
Figure 1:
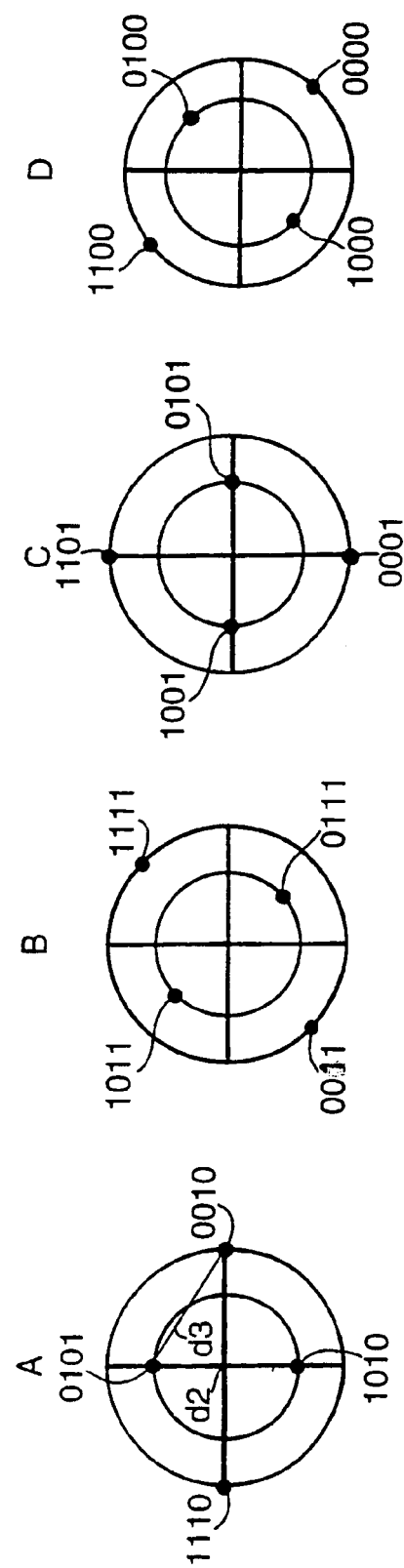

The invention concerns a coding method for modulation of carrier signals with 16 different digital states (4-bit signals).

The invention also concerns the use of a receiver with a convolutional decoder, whose coding parameters are determined according to the coding method.

PRIOR ART

A 16-PSK coding is used, in particular, for transmission of digital signals, in which 16 different phase positions, i.e., phase differences of 22.5°, must be detectable. 16 different digital states, i.e., 4-bit words, can therefore be transmitted with phase information in this method.

The transmission link under practical conditions is subject to not insignificant disturbances. The task in the receiver is therefore to select all possible undisturbed receiving sequences that are to be transmitted with the highest probability through the disturbed receiving sequence. Calculation of the highest probability occurs in that the minimal Euclidean distance between the possible undisturbed receiving sequences and the actually observed disturbed receiving sequence is determined. If all receiving sequences are conceivable, in principle, an unduly high calculation demand develops for practical applications. It is therefore known to carry out the calculation of the highest probability recursively in the receiver and separate most of the sequences as not possible during the recursion. For this purpose, an algorithm offered by Viterbi is used for decoding of the convolution codes, so that the receiver is equipped with a so-called Viterbi decoder. Limitation of calculation of possible code word sequences occurs by determination of possible state transitions by means of a trellis diagram.

The use of a code that distinguishes 16 digital states is advantageous for the transmittable data density and therefore the transmission speed. During use of a 16-PSK code, however, the problem of reduced synchronization robustness arises, since relatively small phase differences must be detectable in the receiver. Methods are known from DE 195 29 982 A1 and 195 29 983 A1 for increasing the synchronization robustness for the TC 16-PSK transmission in that, during the tracking phase, evaluation of the so-called best state information of the Viterbi decoder on the receiving side is carried out. Because of this, roughly the synchronization robustness as in an 8-PSK constellation is achieved with this type of transmission A decisive quality criterion is also the "coding gain", which can be achieved with reference to an uncoded transmission.

ADVANTAGES OF THE INVENTION

The underlying problem of the invention is to permit improvements with respect to synchronization robustness and coding gain with a new coding method.

With this problem as point of departure, according to the invention. in a coding method of the type just mentioned, its coding parameters are obtained with the following process steps:

a) Use of a 2ASK/8PSK coding
b) Selection of a deconvolution code and determination of all possible code word sequences with the free distance of the deconvolution code
c) Formation of possible mappings by division of a partial set of 2ASK/8PSK channel bits into subsets
d) Selection of those mappings, in which, after determination of the optimal radii (ac, c) of the two amplitudes for each possible mapping, the resulting minimal Euclidean distance between two possible subset sequences (code word sequence) becomes maximal.

The invention therefore offers a dimensioning method, through which the minimal Euclidean distances are maximized, so that an increased coding gain is achieved for the 2 ASK/8 PSK coding employed here. Since an even higher coding gain is achieved according to the invention for practicable application with the 2 ASK/8 PSK coding according to the invention than with the ordinarily employed TC 16-PSK coding, the coding method according to the invention is superior. Moreover, the mentioned improvement in synchronization robustness according to DE 195 29 982 A1 and DE 195 29 983 A1 can also be applied in the method according to the invention, in which case roughly the synchronization robustness of 4 PSK is achieved.

The invention offers the further advantage that ordinary receivers with a Viterbi decoder can be used, which need only be slightly altered for their use to receive coded signals according to the invention. Merely an adjustment of the so-called branch-metric table is generally required.

It has been found that the FM sensitivity during reception of coded signals according to the invention can be improved by about 3 dB relative to signals coded according to TC 16-PSK.

DRAWINGS

Figure 2:
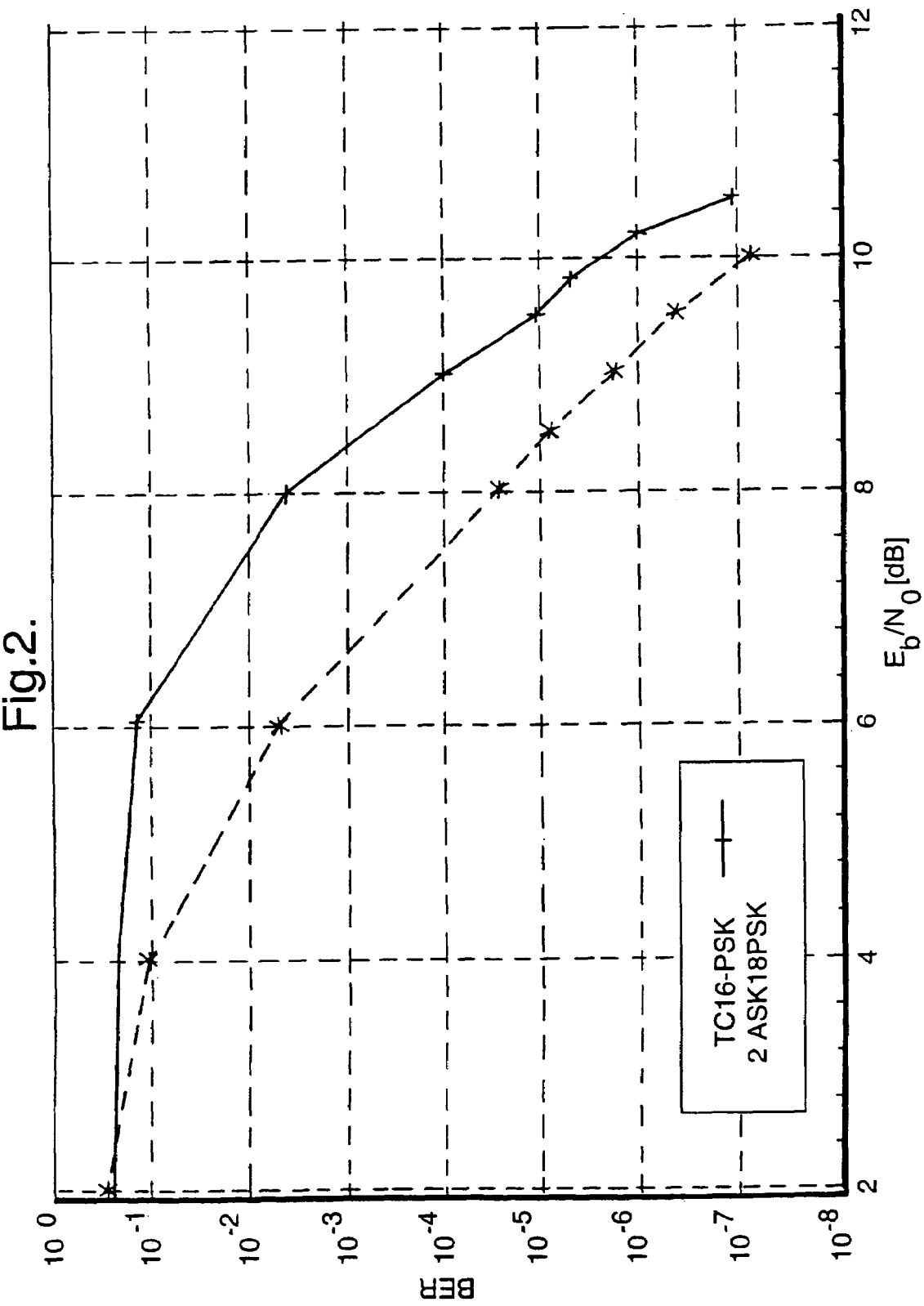

The invention will be further explained below with reference to the accompanying drawing. In the drawing:

FIG. 1 shows a 2 ASK/8 PSK symbol constellation according to the invention with 4 subsets that are formed by identical 2 LSB FIG. 2 shows a depiction of the bit error rate as a function of the disturbance spacing $E_b/N_b$, referred to one bit.

DESCRIPTION OF PRACTICAL EXAMPLES

The invention is explained on the example of a special deconvolution code (pragmatic trellis coding). FIG. 1 shows a 2 ASK/8 PSK symbol constellation, as employable according to the invention. The allocation into subsets A, B, C, D, formed by consistent 2 LSB (least significant bits), is arbitrary, in principle. The mapping shown in FIG. 1 is optimal for special implementation in a pragmatic trellis coding.

Ordinarily, a deconvolution code is now chosen. For this deconvolution code according to the invention, all code word sequences are determined with the free distance of the deconvolution codes. It is assumed that CWMAX such code word sequences exist. The running index is designated CW=0 . . . CWMAX−1.

For design of the 2 ASK/8 PSK symbol constellation according to the invention, the minimal Euclidean distance of the trellis-coded symbol alphabet is calculated as a gauge for the asymptotic error behavior. This minimal distance is calculated according to the formula $$d_{min} = \min(d^{code}_{min}, d^{uncode}_{min})$$

The left part in parentheses considers the minimal Euclidean distance of the coded information bits. This term is determined by the selected mapping and the proper use of the employed deconvolution code. The right part considers the minimal Euclidean distance in the partition of the third plane (4*4 points), i.e., the minimal distance of the two unprotected information bits. This quantity can be obtained directly from geometric calculations.

The deconvolution code usually employed in pragmatic trellis coding (generator polynomial (octal): 133, 171) has a free distance of 10. For calculation of the minimal distance of the coded information bit, the minimal Euclidean distance of the code word sequence must be determined with the output weight 10 from the code word sequence with the weight 0 (i.e., the permanent null sequence).

The following table shows all possible 11 code word sequences with output weight 10.

| Input weight | Code word sequence |
|---|---|
| 1 | 1 (1.1) (1.0) (0.0) (1.1) (1.1) (0.1) (1.1) |
| 2 | 2 (1.1) (0.1) (1.0) (1.1) (0.0) (1.0) (1.0) (1.1) |
| 3 | 3 (1.1) (0.1) (0.1) (0.1) (0.1) (0.0) (0.1) (0.1) (1.0) (1.1) |
| 4 | 2 (1.1) (1.0) (0.0) (0.0) (0.1) (0.1) (0.0) (1.1) (0.1) (1.1) |
| 5 | 3 (1.1) (0.1) (1.0) (0.0) (1.0) (1.0) (0.1) (0.0) (0.1) (1.1) |
| 6 | 3 (1.1) (1.0) (1.1) (0.1) (0.0) (0.0) (0.0) (1.0) (0.0) (0.1) (1.1) |
| 7 | 3 (1.1) (1.0) (0.0) (0.0) (1.0) (1.1) (0.0) (0.0) (1.0) (1.0) (1.1) |
| 8 | 4 (1.1) (1.0) (0.0) (0.0) (1.0) (0.0) (1.0) (0.0) (0.1) (0.1) (1.0) (1.1) |
| 9 | 5 (1.1) (0.1) (0.1) (0.1) (1.0) (0.0) (0.0) (0.0) (0.0) (1.0) (1.0) (1.1) |
| 10 | 4 (1.1) (1.0) (0.0) (0.0) (0.1) (1.0) (1.0) (0.0) (0.0) (0.0) (1.0) (0.0) (0.1) (1.1) |
| 11 | 6 (1.1) (1.0) (0.0) (0.0) (1.0) (0.0) (1.0) (0.0) (1.0) (0.0) (0.0) (0.0) (1.0) (1.0) (1.1) |

The Euclidean distance of the code word sequence is calculated from $$d_{Pfad} = \sqrt{n \cdot d_{11}^2 + m \cdot d_{01}^2 + k \cdot d_{10}^2}$$

in which
- $d_{11}$ denotes the minimal geometric distance of a 00→11 transition and n denotes the number of these transitions in the considered code word sequence
- $d_{01}$ denotes the minimal geometric distance of the 00→01 transition and m denotes the number of these transitions in the considered code word sequence
- $d_{10}$ denotes the minimal geometric distance of the 00→10 transition and k denotes the number of these transitions in the considered code word sequence.

This distance is therefore dependent on the selected mapping and the properties of the deconvolution code.

A division of the 2 LSBs into subsets A, B, C and D is carried out for choice of the mapping.

Overall, there are 24 mapping allocations that are shown in the following table. The running index map therefore runs between 0 and 23.

| map | Subset A | Subset B | Subset C | Subset D |
|---|---|---|---|---|
| 0 | 00 | 01 | 10 | 11 |
| 1 | 00 | 01 | 11 | 10 |
| 2 | 00 | 10 | 01 | 11 |
| 3 | 00 | 10 | 11 | 01 |
| 4 | 00 | 11 | 01 | 10 |
| 5 | 00 | 11 | 10 | 01 |
| 6 | 01 | 00 | 10 | 11 |
| 7 | 01 | 00 | 11 | 10 |
| 8 | 01 | 10 | 00 | 11 |
| 9 | 01 | 10 | 11 | 00 |
| 10 | 01 | 11 | 00 | 10 |
| 11 | 01 | 11 | 10 | 00 |
| 12 | 10 | 00 | 01 | 11 |
| 13 | 10 | 00 | 11 | 01 |
| 14 | 10 | 01 | 00 | 11 |
| 15 | 10 | 01 | 11 | 00 |
| 16 | 10 | 11 | 00 | 01 |
| 17 | 10 | 11 | 01 | 00 |
| 18 | 11 | 00 | 01 | 10 |
| 19 | 11 | 00 | 10 | 01 |
| 20 | 11 | 01 | 00 | 10 |
| 21 | 11 | 01 | 10 | 00 |
| 22 | 11 | 10 | 00 | 01 |
| 23 | 11 | 10 | 01 | 00 |

The allocation of 2 MSBs is irrelevant for the dimensioning described here.

For the selected deconvolution code in a selected mapping map, the optimal dimensioning is carried out. Generally, this is to be carried out for all 24 possible allocations according to the table. The optimal solution viewed overall is then the mapping, in which the resulting minimal Euclidean distance is maximal after determination of the radii according to the described method.

The following apply as dimensioning equations:

Normalization: (average transmission output=1)
$$8(ac)^2 + 8c^2 = 16 \quad\quad 1.$$

$$d\frac{cod}{min} = d\frac{uncod}{min} \Rightarrow$$

$$n \cdot d\frac{2}{11} + m \cdot d\frac{2}{01} + k \cdot d\frac{2}{10} = (2ac)^2$$

if $2ac \leq \sqrt{c^2 + (ac)^2}$ $(a \leq 0.577)$ or $n \cdot -d\frac{2}{11} + m \cdot d\frac{2}{01} + k \cdot d\frac{2}{10} = c^2 + (ac)^2$ if $2ac \geq \sqrt{c^2 + (ac)^2}$ $(a \geq 0.577)$ The already explained comments then apply for n, m and k, as well as $d_{11}$, $d_{01}$ and $d_{10}$. The minimal geometric distances $d_{xx}$ are expressed by means of the parameters a and c, with $a \leq 1$, so that equations 1 and 2 represent the determination equations for a and c. These determination equations are to be evaluated for all code word sequences CW=0 ... CWMAX−1 with the free distance of the employed convolution code and all 24 different allocations map=0 ... 23.

For all value pairs (a(cw, map), c(cw, map)), the value pair (a(cw$_{opt}$, map$_{opt}$), c(cw$_{opt}$, map$_{opt}$)) that gives the maximum values for the pairs ($d^{code}_{min}$(cw, map) $d^{uncode}_{min}$(cw, map))

for all code word sequences with the free distance of the employed deconvolution code is to be used. It is then checked beforehand whether the minimal Euclidean distances $d_{11}$, $d_{10}$ and $d_{01}$ used in the determination equation also actually represent the corresponding minimal distance for the value pair $(a(cw_{opt}, map_{opt}), c(cw_{opt}, map_{opt}))$ determined from it.

If the mapping according to FIG. 1 is chosen, the dimensioning equations are obtained as follows:

Normalization: (average transmission output=1)
$$8(ac)^2 + 8c^2 = 16 \qquad 1.$$

$$d\frac{cod}{min} = d\frac{uncod}{min} \Rightarrow$$

$$n \cdot d\frac{2}{11} + (m+k) \cdot d\frac{2}{01/10} = (2ac)^2$$

if $2ac \leq \sqrt{c}^2 + (ac)^2$ ($a \leq 0.577$)

or $n \cdot d\frac{2}{11} + (m+k) \cdot d\frac{2}{01/10} = c^2 + (ac)^2$ if $2ac \geq \sqrt{c}^2 + (ac)^2$ ($a \geq 0.577$)

with $d_{11} = d_1 = c - ac$ if $c - ac \leq ac\sqrt{2}$ ($a \geq 0.4142$) or $d_{11} = d_1 = ac\sqrt{2}$ if $ac\sqrt{2} \leq c - ac$ ($a \leq 0.4142$) and $d_{01} = d_{10} = d_0 = ac\sqrt{2(1-\sqrt{0.5})}$.

The so described dimensioning of the 2 ASK/8 PSK symbol constellation represents the general case. In practice, a simplified dimensioning suggests itself. For this purpose, it can be assumed that $d_1 = d_{11} \leq mt;epmrl;\sqrt{2}rlxmx \cdot d_0 = 2 \cdot d_{01} = \sqrt{2} \cdot d_{10}$. In this case, the code word sequence with the maximum $n = n_{max}$ (i.e., the code word sequence with the maximum number of code words 11) is the "worst case sequence", which ultimately determines the parameters a and c. The parameters a and c were only determined for this case (a=0.5432, c=1.24270, $d_1$=0.56765 and $d_0$=0.56765; i.e., $d_1 \leq \sqrt{2} \cdot d_0$) and the Euclidean distances determined for all code word sequences. As expected, the code word sequence with $n = n_{max}$ determines the minimal distance $d^{code}_{min}$, which is equal to $d^{uncode}_{min}$ according to the design criterion. Evaluation of the dimensioning equations for all other code sequences gives $d^{code}_{min} = d^{uncode}_{min}$ for the considered code word sequence. For the code word sequence with $n = n_{max}$, $d^{code}_{min} \neq d^{uncode}_{min}$ and the minimum of it $(min(d^{code}_{min}, d^{uncode}_{min}))$ is smaller than during special calculation of the value pair (a·c) for this code word sequence.

With the values determined above, the minimal distance in the partition of the third plane is $d^{uncode}_{min} = 2ac = 1.350$.

For comparison of the Euclidean distances between the ordinary 16 PSK and the 2 ASK/8 PSK configuration according to the invention, the minimal Euclidean distances are summarized in the following table for the code word transitions 00→11 and 00→01/10, as well as between neighboring symbols of the third partition step.

| Euclidean distance | 2 ASK/8 PSK | 16 PSK |
|---|---|---|
| $d_0 = d_{11}$ | 0.5166 | 0.3902 |
| $d_1 = d_{10} = d_{01}$ | 0.5677 | 0.7654 |
| $d_2 = d\frac{uncod}{min}$ | 1.3501 | 1.4142 |

Asymptotic Coding Gain

For the constellation dimensioned beforehand, the Euclidean distance is now calculated for each code sequence with output weight 10 and compared with TC 16-PSK.

The following apply
for TC 16-PSK: $d_1 = d_{11} = 0.7654$, $d_0 = d_{11} = d_{10} = 0.3902$
for 2 ASK/8 PSK: $d_1 = d_{11} = 0.5677$, $d_0 = d_{01} = d_{10} = 0.5167$

| Code sequence | n | m | k | Distance for TC16-PSK | Distance for 2 ASK/8 PSK |
|---|---|---|---|---|---|
| 0 | 4 | 1 | 1 | 1.627 | 1.350 |
| 1 | 3 | 1 | 3 | 1.538 | 1.426 |
| 2 | 2 | 5 | 1 | 1.444 | 1.499 |
| 3 | 3 | 1 | 3 | 1.538 | 1.426 |
| 4 | 2 | 3 | 3 | 1.444 | 1.499 |
| 5 | 3 | 2 | 2 | 1.538 | 1.426 |
| 6 | 3 | 0 | 4 | 1.538 | 1.426 |
| 7 | 2 | 2 | 4 | 1.444 | 1.499 |
| 8 | 2 | 3 | 3 | 1.444 | 1.499 |
| 9 | 2 | 2 | 4 | 1.444 | 1.499 |
| 10 | 2 | 0 | 6 | 1.444 | 1.499 |

It can be interpreted from the table that $$d^{code}_{min} = d^{uncode}_{min} = 1.350.$$

The asymptotic coding gain relative to TC 16-PSK is now:

$$G = 20 \cdot lg \frac{d^{TC8-8PSK/ASK}_{min}}{d^{TC16-PSK}_{min}} = 20 \cdot lg \frac{1.350}{\sqrt{2}} = -0.4 \text{ dB}$$

This means that the new constellation is asymptotically poorer by 0.4 dB than TC 16-PSK.

Error Rates

The trend of the bit error rates over $E_{bit}/N_0$ of the 2 ASK/8 PSK constellation is shown in FIG. 2, in comparison with TC 16-PSK. The employed coding in both cases is the pragmatic trellis coding with the previously selected convolution code.

The following table documents the coding gains that can be achieved with this constellation relative to TC 16-PSK.

| Bit error rate | Coding gain of TC8-8-PSK/ASK Relative to TC16-PSK |
|---|---|
| $10^2$ | 1.9 dB |
| $10^3$ | 1.8 dB |
| $10^4$ | 1.5 dB |
| $10^5$ | 1.2 dB |
| $10^6$ | 1.0 dB |
| $10^7$ | 0.6 dB |
| Asymptotic | −0.4 dB |

As in TC 16-PSK operation, auxiliary signals for carrier derivation can also be obtained in the constellation of FIG. 1 for 2 ASK/8 PSK by evaluation of the best-state metric of the Viterbi decoder. The auxiliary signals indicate whether the two LSBs in the received signal are equal or unequal. This information is sufficient in the present mapping to decide whether the received signal point is rotated by an odd multiple of 45° or a multiple of 90° relative to the reference carrier. Roughly the robustness of a QPSK-constellation can accordingly be achieved for the constellation containing 16 symbols of FIG. 1.

The described practical example shows that a coding gain between 1.0 and 2.0 dB relative to the prior art TC 16-PSK can be achieved with the coding according to the invention in the error rate range from $10^{-6}$ to $10^{-2}$.

The asymptotic loss of 0.4 dB is not relevant for practical systems that are operated in the error rate ranges between $10^{-8}$ and $10^{-4}$.

The synchronization for the simple constellation according to the invention is more robust than in TC 16-PSK, since only 8 permitted angles exist in the complex planes. As in TC 16-PSK, roughly the synchronization robustness as in a QPSK constellation can be achieved in the method according to the invention during the tracking phase by evaluation of so-called best state information of the Viterbi decoder on the receiving side.

The invention claimed is:

1. A method of determining coding parameters of a convolution decoder for improving coding gain in a receiver for receiving carrier signals modulated with sixteen different digital states, comprising the step of:
   a) using a 2 ASK/8 PSK coding;
   b) selecting a deconvolution code for the decoder and determining all possible code word sequences with a free distance of the deconvolution code;
   c) forming possible mappings by allocating a partial set of 2 ASK/8 PSK channel bits into subsets; and
   d) selecting the possible mappings in which, after determining optimal radii of two amplitudes for each possible mapping, a minimal Euclidean distance produced between two possible subset becomes maximal thereby improving the coding gain, the optimal radii denoted by ac and c being determined by the following equations:

$$8(ac)^2 + 8c^2 = 16$$

$$n \cdot d_{11}^2 + m \cdot d_{01}^2 + k \cdot d_{10}^2 = (2ac)^2$$

for $$2ac \leq \sqrt{c^2 + (ac)^2}$$

and $$n \cdot d_{11}^2 + m \cdot d_{01}^2 + k \cdot d_{10}^2 = c^2 + (ac)^2$$

for $$2ac \geq \sqrt{c^2 + (ac)^2},$$

in which $d_{11}$ is the minimal geometric distance of a subset transition 00→11 and n is the number of these transitions in the considered code word sequence, $d_{01}$ is the minimal geometric distance of a subset transition 00→01 and m is the number of these transitions in the considered code word sequence and $d_{10}$ is the minimal geometric distance of a subset transition 00→10 and k is the number of these transitions in the considered code word sequence.

2. The method according to claim 1, characterized by the fact that the subsets are chosen by the following equations:

$$d_{11} = d_1 = c - ac$$

for $$c - ac \leq ac \cdot \sqrt{2}$$

or $$d_{11} = d_1 = ac \cdot \sqrt{2}$$

for $$ac \cdot \sqrt{2} \leq c - ac$$

and $$d_{01} = d_{10} = d_0 = ac\sqrt{(1 - \sqrt{0.5})}.$$

3. The method according to claim 2, characterized by the fact that, for determining the optimal radii, it is assumed that:

$$d_1 \leq \sqrt{2} \cdot d_0.$$

* * * * *